Wyckoff & Morrison,
Boring Wood.
No. 404.
Reissued, Oct. 14, 1856.
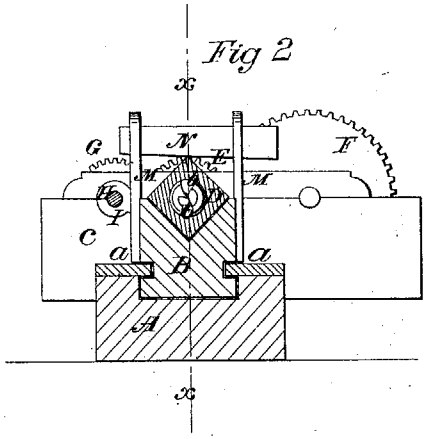
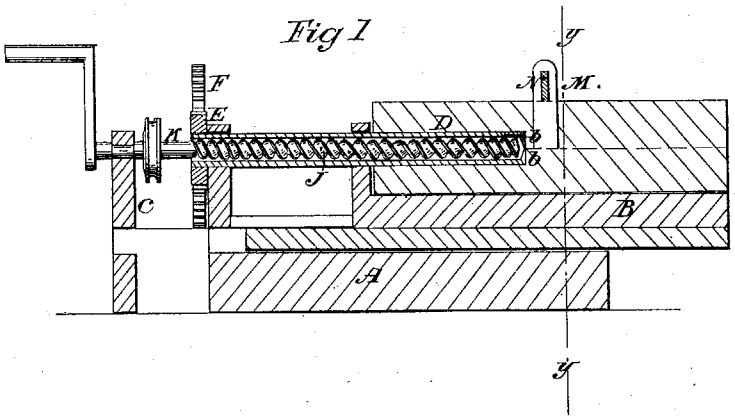
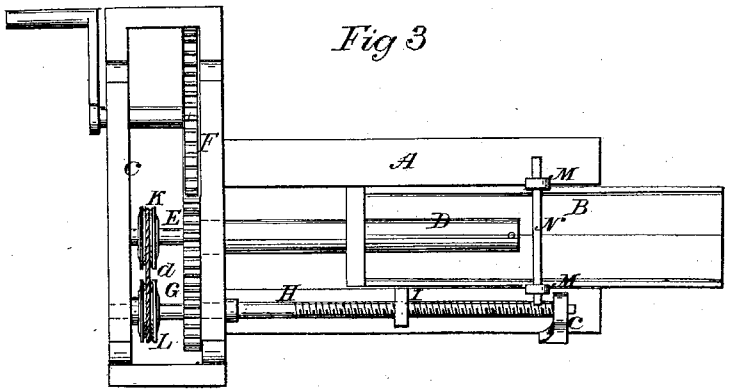
AM. PHOTO-LITHO. CO. N.Y. (OSBORNE'S PROCESS.)

UNITED STATES PATENT OFFICE.

A. WYCKOFF AND E. R. MORRISON, OF ELMIRA, NEW YORK, ASSIGNORS TO A. WYCKOFF.

IMPROVED BORING-MACHINE.

Specification forming part of Letters Patent No. 13,606, dated September 25, 1855; Reissue No. 404, dated October 14, 1856.

*To all whom it may concern:*

Be it known that I, ARCALOUS WYCKOFF, of Elmira, in the county of Chemung and State of New York, have invented a new and Improved Boring-Machine, intended, chiefly, for boring pump-logs; and I do hereby declare that the following is a full, clear, and exact description of the same, reference being had to the annexed drawings, making a part of this specification, in which—

Figure 1 is a longitudinal vertical section of my improvement, *x x*, Fig. 2, showing the plane of section. Fig. 2 is a transverse vertical section of the same, *y y*, Fig. 1, showing the plane of section; Fig. 3, plan or top view of the same.

Similar letters of reference indicate corresponding parts in the several figures.

The nature of my invention consists in, first, the employment or use of a tubular or hollow auger or bit, constructed and arranged as will be presently shown, and also in the combination of the tubular or hollow auger or bit with a screw or worm rod arranged and operating as will be hereinafter described.

To enable others skilled in the art to make and use my invention, I will proceed to describe its construction and operation.

A represents a bed-piece in which a carriage, B, is fitted and slides longitudinally, the carriage working between suitable guides, *a a*, as as shown in Fig. 2.

To the end of the bed-piece A a transverse box, C, is attached.

D represents an auger of a tubular form. The back end of the auger has its bearing in the inner side of the box C, and the outer end of the auger passes through the inner side of the carriage B, which side forms the other bearing. The bits or cutting portion *b* of the auger are attached to its outer end, and are placed over the bore of the auger, the points of the bits just passing the center of the bore, so as to cut a clean hole without leaving a core. The cutting-edge of each bit is slightly rounded longitudinally, as shown in Fig. 2.

I do not use any screw on the end of my bit or auger, as I find that a screw has a tendency to follow the grain of the wood, and in boring a long log or piece of timber it is apt to deviate from a straight line, causing the auger to work tightly. This difficulty I entirely avoid by the shape of my bit or auger, as the cutting-lips have no tendency to follow the grain of the wood, but always keep on a straight line.

To the inner or back end of the auger D there is attached a pinion, E, into which a toothed wheel, F, gears, the wheel F being hung in the box C. The pinion E on the auger D gears into a pinion, G, on one end of a screw-rod, H, the inner bearing of which is in the inner side of the box C, and the bearing *c*, at the outer end of the screw-rod, is attached to the bed-piece A.

I represents a nut through which the screw-rod H passes, said nut being attached to one side of the carriage B.

Within the hollow or tubular auger D there is placed a screw or worm rod, J. (See Fig. 1.) This screw or worm rod represents the screw portion of an ordinary screw-auger and extends the whole length of the auger D, its outer end nearly touching the bits *b* of the auger. The inner end or shank of the screw or worm rod J has its bearing in the outer side of the box C, and the pulley K is placed upon the shank of the screw or worm rod J, a band, *d*, passing around said pulley and also around a pulley, L, on the back end of the screw-rod H.

The auger or bits and worm J are detached and revolve independent of each other, by which means I am able to run the worm J at a much greater speed than the bits or auger, and which serves to clear the chips from the bits as fast as they are made, and prevents the same from choking.

To each side of the carriage B an upright, M, is attached. Through the upper parts slots are cut, one in each, in which slots a taper key, N, is fitted.

Operation: The log to be bored (shown in red) is placed in the carriage B and is firmly secured therein by the key N, the carriage being drawn out from the bed-piece A, so that the end of the log will be in contact with the outer end of the auger or bits D. Motion is then given the toothed wheel F in any proper manner, and the auger or bits D will rotate and also the screw or worm rod J, the auger or bits turning in a reverse direction to the screw or worm rod. As the bits *b* cut the wood or log the chips pass within the auger, and the worm or screw rod, revolving at a greater speed than the auger, passes the chips out freely at the back end of the auger. The log is fed to the auger or bit as fast as they will cut by means of the screw-rod H and nut I, motion being communicated to the screw-rod by the band *d*, which passes around the pulleys K L.

By the above improvement logs may be bored directly through their center from end to end.

The machine requires but little attendance and works rapidly. The auger cannot follow the grain of the wood, and consequently will not be deflected from its direct course.

Having thus fully described the construction and operation of my invention, I am aware that tubular or hollow augers, as such, are not new, nor do I claim it as new; but

What I claim as new, and desire to secure by Letters Patent, is—

1. The tubular or hollow auger or bits D, as constructed, having the cutting-lips of the bits approach the center and yet separated from each other, doing without the use of a screw on the end of the bit, for the purpose of preventing the bit from following the grain of the wood.

2. The worm J, operating on its own axle and independent of the revolutions of the auger or bits D, for the purpose of clearing away the chips, as set forth.

ARCALOUS WYCKOFF.

Witnesses:

T. G. CLAYTON,

JOS. C. CLAYTON.